United States Patent Office 3,399,246
Patented Aug. 27, 1968

3,399,246
OXYDEHYDROGENATION OF OLEFINS
Lee Traynor, Cleveland Heights, and Jamal S. Eden, Akron, Ohio, assignors to The B. F. Goodrich Company, New York, N.Y., a corporation of New York
No Drawing. Filed Aug. 30, 1967, Ser. No. 664,250
6 Claims. (Cl. 260—680)

ABSTRACT OF THE DISCLOSURE

Olefins such as methylbutenes and butenes are dehydrogenated with oxygen in the presence of a catalyst containing a mixture of cobalt pyrophosphate and silver pyrophosphate to form isoprene or butadiene-1,3.

BACKGROUND OF THE INVENTION

Isoprene is becoming commercially important and an improved process for converting isopentenes into isoprene at economic conversions is desired. Dehydrogenation of butenes to butadiene-1,3 has been carried out commercially for many years by passing butenes mixed with steam over an iron based catalyst at elevated temperatures. The selectivity, and particularly conversion, of butenes to butadiene-1,3 has been lower than was desired. By conducting such dehydrogenations in the presence of oxygen, improved conversion of the butenes to butadiene-1,3 has been obtained in the presence of certain catalysts. However, high selectivity is not always obtained and additional catalyst systems for oxydehydrogenating olefins to diolefins are desired.

SUMMARY OF THE INVENTION

We have now found that methyl butenes or butenes may be converted to isoprene or butadiene-1,3 at excellent conversions and very high selectivities by conducting the dehydrogenation reaction of the methyl butenes or butenes mixed with oxygen at an elevated temperature in the presence of a catalyst which is a mixture of cobalt pyrophosphate and silver pyrophosphate wherein the mol fraction of cobalt to silver in the mixtures is from about 0.05 to about 0.8.

DETAILED DESCRIPTION

The reactants for providing conjugated dienes such as butadiene-1,3 and isoprene are the butenes as butene-1, trans-butene-2, cis-butene-2 and mixtures thereof; and the isopentenes as 2-methyl-butene-1, 2-methyl-butene-2, 2-methyl-butene-3 and mixtures thereof. Mixtures of butenes and methyl-butenes may be dehydrogenated. These olefins may be fed to a dehydrogenation reactor in a purified form or as mixed hydrocarbon streams from refinery streams, cracking units, streams obtained from other dehydrogenation reactions and the like.

The amount of oxygen used in dehydrogenating the olefins is in the range from about 0.5 to 2.5 mols of oxygen per mol of olefin. Preferably more than 0.5 to less than 1.5 mols are used. The oxygen may be employed as pure oxygen, in air, as oxygen mixed with inert diluents, as oxygen enriched air and the like.

The dehydrogenation reaction preferably is conducted in the presence of steam. The amount of steam employed may be varied from about 2 to about 30 or more mols of steam per mol of olefin.

The temperature for the dehydrogenation reaction will be in the range of about 400° C. to about 700° C. and at contact times normally in the range of about 3 to about 35 seconds (calculated at 25° C. and 760 mm. pressure). Usually the reaction temperature will be above about 500° C.

The dehydrogenation reaction may be conducted above atmospheric pressure, at atmospheric pressure or below atmospheric pressure. Normally the total pressure on the system will be slightly in excess of atmospheric pressure, as 5 p.s.i. or more.

The reaction may be conducted either in fixed bed or fluidized bed reactors.

The catalysts of this invention, comprising mixtures of cobalt and silver pyrophosphates may be prepared by mixing together cobalt and silver pyrophosphates, either dry or as dispersions. The catalysts are readily prepared from solutions of water soluble salts of cobalt and silver and phosphoric acid added thereto, either separately or to a mixture, after which water is evaporated. While the catalyst may be used unsupported, use of catalyst supports of the type known to those skilled in the art is preferred.

Particularly useful supports are silica-base supports which provide enhanced selectivities, and better results have been obtained with finely divided silica having surface areas greater than about 15 sq. meters per gram.

The ratio of cobalt pyrophosphate to silver pyrophosphate is critical in the practice of the invention and it has been found that the mol fraction of cobalt to silver in the catalyst must be in the range of about 0.05 to 0.8; more preferably, between 0.3 to 0.6. Particularly useful catalysts are those having a mol ratio of cobalt pyrophosphate to silver pyrophosphate of about 1, that is, a mol fraction of cobalt to silver of about 0.5, $Co/AgP_2O_7^{-4}$. It also has been found that the pyrophosphates give superior selectivities when compared to mixtures of cobalt phosphate and silver phosphate only. However, phosphate may be present with the pyrophosphates.

EXAMPLE I

To demonstrate the practice of the invention a catalyst was prepared as follows:

0.4 mol of $Co(NO_3)_2$ was dissolved in 100 ml. of water. 0.4 mol of $AgNO_3$ was dissolved in 100 ml. of water. The $Co(NO_3)_2$ solution was added to 495.6 grams of Ludox H.S. in a container (Ludox H.S. is a 30–35% colloidal dispersion of microspheroidal silica). The $AgNO_3$ solution was then added to this mixture. 0.6 mol of $H_3PO_4$ (85%) was then added and water evaporated on a steam bath. The residue was baked at 550 to 575° C. for 16 hours. The calcined catalyst was crushed to 18–30 mesh (U.S. Sieve). The catalysts are also readily prepared by adding $Co_2P_2O_7$ and $Ag_4P_2O_7$ powders to the Ludox H.S. dispersions, heating to evaporate the water, and calcining.

This catalyst was evaluated in a fixed bed silica tube reactor containing 180 ml. of catalyst. External electrical heating coils were wound on the reactor. The butenes, water and air were metered separately, mixed in a preheater at 200 to 250° C. and passed into the reactor which was at a temperature of about 610° C. The reaction products were quenched, dried and fed to a gas chromatograph and analyzed. The mol ratio of reactants charged was one mol of butene-2, 0.97 mol of oxygen as air (3.7 mols of nitrogen) with 15.4 mols of water as steam, and the contact time was 22 seconds. In a continuous run, after 8 hours operation, 40.8% of the butene-2 was being converted and the selectivity to butadiene-1,3 was 81.3%. The effluent also contained 6.9% carbon dioxide, 6.4% carbon monoxide and 4.4% ethane.

EXAMPLE II

Another catalyst was prepared by adding, in a mol ratio of 1:1, cobalt pyrophosphate powder and silver pyrophosphate powder to a Ludox H.S. dispersion. The mixture was dried, calcined at 550° C. and ground to 10–18 mesh. 65 ml. of the catalyst was placed in a 65 ml. Vycor tube reactor. Butenes were dehydrogenated under the following conditions and molar ratio of reactants per mol of butenes. Oxygen was added as air. Conversion and selectivity to butadiene-1,3 are listed in the table as mol percent.

TABLE I

| Temp., °C. | Contact time, seconds | Oxygen, mols | Steam, mols | Butene conversion, mol percent | Selectivity to butadiene-1,3, mol percent | $CO_2$, mol percent |
|---|---|---|---|---|---|---|
| 570 | 11 | 0.93 | 8.6 | 36 | 92 | 8 |
| 620 | 11 | 0.93 | 8.6 | 47 | 85 | 11 |
| 660 | 11 | 0.93 | 8.6 | 51 | 83 | 11 |
| 610 | 10 | 1.42 | 8.6 | 40 | 87 | 9 |

EXAMPLE III

Isopentenes were dehydrogenated to isoprene using a catalyst prepared according to the procedure of Example I in the reactor described in Example II. Mol ratios of reactants per mol of isopentene and reaction conditions are set forth as data Table II.

TABLE II

| Temp., °C. | Contact time, seconds | Oxygen, mols | Steam, mols | Isopentene conversion, mol percent | Selectivity to isoprene, mol percent | $CO_2$, mol percent | CO, mol percent |
|---|---|---|---|---|---|---|---|
| 575 | 12 | 0.93 | 8.6 | 46 | 90 | 7 | |
| 600 | 12 | 0.93 | 8.6 | 45 | 79 | 13 | 3 |
| 645 | 11 | 0.99 | 17.2 | 69 | 64 | 2 | 2 |

EXAMPLE IV

Isopentenes were dehydrogenated to isoprene over a catalyst prepared according to the procedure of Example I with amounts of cobalt and silver salts to provide a catalyst of a Co/Ag ratio of 1:3 on Ludox H.S. as the pyrophosphates. Mol ratios of reactants per mol of isopentenes, reaction conditions and results of the reactions are set forth in data Table III.

TABLE III

| Temp., °C. | Contact time, seconds | Oxygen, mols | Steam, mols | Isopentene conversion, mol percent | Selectivity to isoprene, mol percent | $CO_2$, mol percent | CO, mol percent |
|---|---|---|---|---|---|---|---|
| 580 | 12 | 0.93 | 8.6 | 56 | 84 | 6.2 | 3.6 |
| 625 | 12 | 0.93 | 8.6 | 67 | 81 | 7.9 | 2.7 |
| 625 | 11 | 0.92 | 8.6 | 60 | 52 | 10.0 | 4.1 |

We claim:
1. A process for dehydrogenating olefins selected from the group consisting of methyl butenes and butenes which comprises contacting at an elevated temperature said olefins and oxygen in a mol ratio of 0.5 to 2.5 mols of oxygen per mol of olefin with a catalyst containing cobalt pyrophosphate and silver pyrophosphate wherein the mol fraction of cobalt to silver is 0.05 to 0.8.

2. The process of claim 1 wherein the temperature is 400° to 700° C., the mol fraction of Co/Ag is between 0.3 and 0.6 and there is present 3 to 30 mols of steam per mol of olefin.

3. The process of claim 2 wherein the catalyst is deposited on a support.

4. The process of claim 3 wherein the support is a silica base support.

5. The process of claim 4 wherein the olefin is a methyl butene, the oxygen is 0.5 to 1.5, the mol ratio of Co/Ag is about 1 and the catalyst is supported on a silica support having a surface area greater than 15 mm.$^2$/gram.

6. The process of claim 4 wherein the olefin is a butene, the oxygen is 0.5 to 1.5, the mol ratio of Co/Ag is about 1 and the catalyst is supported on a silica support having a surface area greater than 15 mm.$^2$/gram.

References Cited

UNITED STATES PATENTS

| 3,110,746 | 11/1963 | Voge et al. | 260—680 |
| 3,173,962 | 3/1965 | Carroll et al. | 252—437 X |
| 3,271,457 | 9/1966 | Brill et al. | 252—437 X |

PAUL M. COUGHLAN, Jr., *Primary Examiner.*